United States Patent [19]

Komine

[11] Patent Number: 5,751,886
[45] Date of Patent: May 12, 1998

[54] VIDEO IMAGE PROCESSING APPARATUS

[75] Inventor: Hitoshi Komine, Hachioji, Japan

[73] Assignee: Olympus Optical Co., Ltd., Tokyo, Japan

[21] Appl. No.: 658,406

[22] Filed: Jun. 5, 1996

[30] Foreign Application Priority Data

Jun. 7, 1995 [JP] Japan .................... 7-140839

[51] Int. Cl.$^6$ .................... H04N 5/94
[52] U.S. Cl. .................... 386/48; 386/50
[58] Field of Search .................... 386/46, 48, 50, 386/85, 86, 107, 113, 117, 119, 38; H04N 5/94

[56] References Cited

U.S. PATENT DOCUMENTS 5,086,345  2/1992  Nakane et al. .................... 386/117

FOREIGN PATENT DOCUMENTS 4-111690  4/1992  Japan.

Primary Examiner—Robert Chevalier
Attorney, Agent, or Firm—Louis Weinstein

[57] ABSTRACT

A video image processing apparatus comprising with a frame memory for temporarily storing field video data from a recording medium, an interpolation processor module for interpolating the field video data stored in the frame memory and a memory control module for controlling writing to and reading from the frame memory, and a CPU for determining field attribute information. In interpolation processing the write line position of the field video data to the frame memory is modified to the odd line position or even line position, depending on whether the field attribute information about the field video data is odd or even. According to the video image processing apparatus, no discrepancy between the odd field and even field takes place when the field video data is interpolated and reproduced.

10 Claims, 15 Drawing Sheets

RECORDED DATA AT ODD FIELD

RECORDED DATA AT EVEN FIELD

SETTING OF SCANNING MODE

|  |  | A | B |
|---|---|---|---|
| NON-INTERLACE |  | 0 | 0 |
| INTERLACE | ODD FIELD | 1 | 0 |
| INTERLACE | EVEN FIELD | 1 | 1 |

FIG.13

| VIDEO PARAMETER TUPLE |
|---|
| TUPLE ID |
| NEXT TUPLE POINTER |
| SCANNING MODE |
| VIDEO MODE |
| NUMBER OF BITS OF PIXEL |
| GAMMA CHARACTERISTICS |
| SIGNAL LEVEL |
| NUMBER OF PIXELS |
| RESERVED |
| VIDEO/PIXEL ASPECT RATIO |
| CODING SYSTEM |
| COMPRESSION RATIO |
| UNCOMPRESSED DATA RECORDING MODE |
| FIELD ATTRIBUTE |
| NUMBER OF FRAMES TAKEN |
| UNUSED |
| NEXT TUPLE |

FIG.14

SETTING OF FIELD ATTRIBUTE

| | A | B |
|---|---|---|
| ODD-ODD-ODD-ODD··· | 0 | 0 |
| ODD-EVEN-ODD-EVEN··· | 0 | 1 |
| EVEN-EVEN-EVEN-EVEN··· | 1 | 0 |
| EVEN-ODD-EVEN-ODD··· | 1 | 1 |

FIG.19
PRIOR ART

| | |
|---|---|
| | L1 |
| | L2' |
| | L3 |
| | L4' |
| | L5 |
| | L6' |
| | L7 |
| | L8' |
| | L9 |
| | L10' |
| | L11 |
| | L12' |
| | L13 |
| | L14' |

RECORDED DATA AT ODD FIELD

FIG.20
PRIOR ART

| | |
|---|---|
| | L2 |
| | L3' |
| | L4 |
| | L5' |
| | L6 |
| | L7' |
| | L8 |
| | L9' |
| | L10 |
| | L11' |
| | L12 |
| | L13' |
| | L14 |
| | L15' |

RECORDED DATA AT EVEN FIELD

VIDEO IMAGE PROCESSING APPARATUS

BACKGROUND OF THE INVENTION

1. Field of the Invention

The present invention relates to a video image processing apparatus, and more specifically, to a video image processing apparatus that interpolates field video image data and a video image processing apparatus that picks up field image data.

2. Related Art Statement

Still video cameras and still video recording/reproducing apparatuses are known as the related art video image processing apparatus. They record and reproduce a television field image signal.

A still image reproducing apparatus, as one of video image processing apparatuses, has determining means for determining whether recorded video data is frame video data or field video data, as shown in FIG. 15. If it is frame video data, the recorded video data is reproduced as it is. If it is field video data, the recorded video data is reproduced after pseudo frame video data is produced (step S22). Whether it is frame video data or field video data is determined according to attribute information, such as a file header, attached to the video data.

Japanese Patent Laid-Open No. 111690 (laid open in 1992) discloses a still image reproducing apparatus typical of the related art video image processing apparatuses and its block diagram is shown in FIG. 16.

In the above video image processing apparatus, the video file recorded in a recording medium 51 is made up of a file header including a video parameter and the like, and video data. The video data is read into a frame memory 52. The video data in the frame memory 52 is then interpolated by an interpolation processor module 54. The frame memory 52 and the interpolation processor module 54 are controlled by a memory control module 53. The image data of the pixels on one scan line and the image data of the pixels on the next scan line, stored in the frame memory 52, are averaged, and the averaged results are stored in vacant addresses sequentially as pixel data to be interlaced at the next field in succession to the field video data recorded. Thus, pseudo frame video data is produced. Referring to the flow diagram in FIG. 17, the operation of the memory control module 53 is now discussed in detail.

The memory control module 53 writes the video data read from the recording medium 51, onto the frame memory 52 on a scan line by scan line basis. In this case, the first line of the recorded video data is written onto the first line of the frame memory 52 (step S31). The second line of the recorded video data is written onto the third line of the frame memory 52 (step S32).

The above steps are repeated until the n-th line, namely, last line of the recorded video data is written onto the (2n−1)-th line of the frame memory 52 (step S34). This completes the write operation of the recorded video data onto the frame memory 52.

To interpolate between lines of the frame memory 52 onto which the video data is recorded, video data on the first and third lines of the frame memory 52 is output to the interpolation processor module 54, and the computed result given by the interpolation processor module 54 is written on the second line of the frame memory 52 (step S35).

The above step is repeated until video data of the (2n−3)-th line and (2n−1)-th line of the frame memory 52 is output to the interpolation processor module 54 and the computed result given by the interpolation processor module 54 is written on the (2n−2)-th line of the frame memory 52 (step S37). This completes the write operation of the pseudo frame video data onto the frame memory 52.

As described above, record field data and interpolated field data are sequentially stored in the physical addresses of the frame memory 52. The timing of reading from the frame memory 52 is controlled by the memory control module 53 and then the read video data is output to a D/A converter 55 (step S38).

The video data read from the frame memory 52 is converted into an analog signal by the D/A converter 55 and then converted by an encoder 56 into a TV signal (a video signal). In the encoder 56, the synchronizing signal generated by a synchronizing signal generator 57 is added to the output from the D/A converter 55.

FIGS. 18 through 20 show frame video signals presented on monitors that are derived from the odd field and even field in the same image taken by the still image reproducing apparatus disclosed by the above Japanese Patent Laid-Open No. 111690 (laid open in 1992). The problem with this still image reproducing apparatus is now discussed referring to these figures.

FIG. 18 shows the scan lines for recording. Full lines represent scan lines for odd field imaging. Broken lines represent scan lines for even field imaging. FIG. 19 shows scan lines when reproduction is made with the odd field video data interpolated. FIG. 20 shows scan lines when reproduction is made with the even field video data interpolated. In FIGS. 19 and 20, the full lines represent the positions of the scan lines for the recorded video data, and the broken lines represent the positions of the scan lines for the interpolated video data with its line number designated Ln'.

In FIG. 18, the recorded odd field video data is the video data designated L1, L3, L5, . . . , and in accordance with the positions of the scan lines of the reproduced video shown in FIG. 19, the first line L1 of the video data is written on the frame memory, and the third line L3 of the video data is written with one line skipped on the frame memory.

The odd field video data is thus sequentially written on the frame memory 52.

To reproduce the field video data, interpolation is performed by averaging the data of the pixels on the line L1 and the data of the pixels on the line L3 recorded on the frame memory. The interpolated video data is written as the video data for a line L2' between the lines L1 and L3 on the frame memory, wherein the video data for the line L2' is interlaced in the next field in succession to the recorded field video data.

In the same way, the video data for lines L4', L6', . . . is sequentially written on the frame memory 52.

The above operation is controlled by the memory control module 53, and the pseudo frame video interpolated is generated and then the frame video image having the same angle of view as the image is taken is thus reproduced.

In FIG. 18, the recorded even field video data is the data on the scan lines as the broken lines L2, L4, L6, . . . , and in accordance with the positions of the scan lines of the reproduced video shown in FIG. 20, the second line L2 of the video data is written on the frame memory, and the fourth line L4 of the video data is written with one line skipped on the frame memory.

The memory areas on which the lines L2 and L4 are written correspond to the memory areas on which the lines L1 and L3 are written.

The even field video data is thus sequentially written on the frame memory 52. To reproduce the field video data, interpolation is performed by averaging the data of the pixels on the line L2 and the data of the pixels on the line L4 recorded on the frame memory.

The interpolated video data is written as the video data for a line L3' between the lines L2 and L4 on the frame memory, wherein the video data for the line L3' is interlaced in the next field in succession to the recorded field video data.

In the same way, the video data for lines L5', L7', . . . is sequentially written on the frame memory 52, and thus the pseudo frame video image interpolated is generated.

As is evident from FIGS. 19 and 20, although an image is taken with the same angle of view, the interpolated video data suffers one line discrepancy between the odd field and even field. One line discrepancy remains in the finished video output. When the images are subjected to a precise comparison and study, the above one line discrepancy poses a serious problem.

The prior art still image recording/reproducing apparatuses usually meet the Standard of JEIDA (Japan Electronic Industry Development Association), part of which is shown in FIG. 7.

When sequence photographing is performed in such a still image recording/reproducing apparatus, the amount of video data increases as the number of fields or frames per second increases. The video data of each field photographed is associated with a file header. The large number of file headers means a great deal of data, increasing the total amount of data even more. This presents difficulty achieving fast record processing speed.

OBJECT AND SUMMARY OF THE INVENTION

The present invention has been developed to resolve the above problems, and it is an object of the present invention to provide a video image processing apparatus that does not present a one-line discrepancy between the odd field and even field when the field video data is interpolated.

It is another object of the present invention to provide a video image processing apparatus which results in no increase in the amount of video data when sequence photographing is performed, and which offers a fast video data recording speed.

The video image processing apparatus of the present invention, in one aspect, comprises a reproducing unit for reproducing field video data from a recording medium that stores the field video data and the field attribute information about the field video data, a video memory for storing temporarily the field video data reproduced by the reproducing unit, an interpolation unit for interpolating the field video data stored in the video memory and then outputting the interpolated video data, and a memory control unit for controlling writing and reading of the video data to and from the video memory, whereby the memory control unit comprises an element for modifying the write line position of the field video data to the video memory, to the odd line position or even line position, depending on whether the field attribute information about the reproduced field video data to be interpolated is odd or even.

In the video image processing apparatus, the write line position of the field video data to the video memory is modified to the odd line position or even line position, depending on whether the field attribute information about the reproduced field video data to be interpolated is odd or even.

The video image processing apparatus of the present invention, in another aspect, comprises a solid-state image pickup device for reading and outputting the charge responsive to an optical image on a field by field basis, a recording unit for processing the field video signal output from the solid-state image pickup device, into a form suitable for recording, and for recording the resulting field video signal to an intended recording medium, a photograph triggering member for triggering a photographing operation, and a control unit for controlling the recording unit so that the recording unit sequentially video records to the recording medium at a predetermined speed as long as the photograph triggering member is activated, whereby, for the recording unit to sequentially record field videos to the recording medium, the control unit comprises an element that performs controlling to record, as the pieces of information common to sequentially recorded videos, the field attribute information comprising the number of a series of sequentially recorded video frames and the field generation pattern based on one selected from sequence photograph recording speeds defined by 60/n=m fields/second (n, m are integers equal to or greater than 1).

When field videos are sequentially recorded by the recording medium, the video image processing apparatus performs controlling to record, as the pieces of information common to sequentially recorded videos, the field attribute information comprising the number of a series of sequentially recorded video frames and the field generation pattern based on one selected from sequence photograph recording speeds.

These and other advantages and features will become more apparent when the following detailed description of the invention is considered with the following drawings.

BRIEF DESCRIPTION OF THE DRAWINGS

FIG. 13 shows the structure of the video parameter tuple in the file header of the video parameter in the electronic still camera of FIG. 11.

FIG. 14 lists the setting codes for the field attribute of the video parameter tuple in the electronic still camera of FIG. 11.

FIG. 19 shows the scan lines when reproduction is made with the video data of the odd field interpolated in the known still image reproducing apparatus of FIG. 16.

FIG. 20 shows the scan lines when reproduction is made with the video data of the even field interpolated in the known still image reproducing apparatus of FIG. 16.

DETAILED DESCRIPTION OF THE PREFERRED EMBODIMENT

Figure 1:
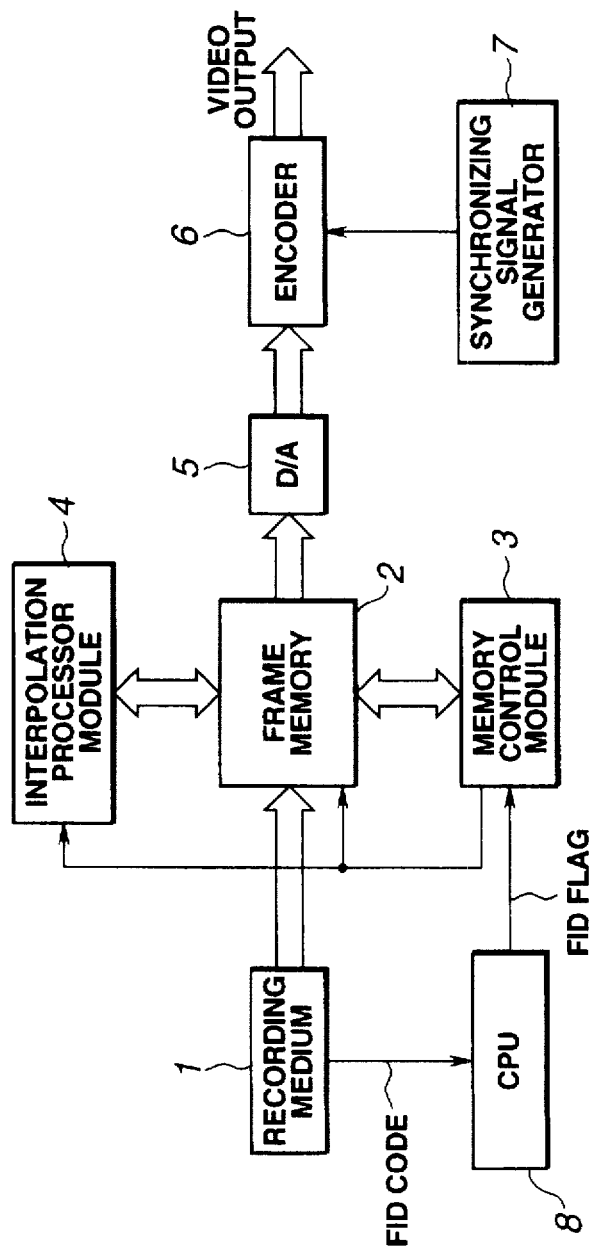
FIG. 1 is a block diagram showing the still image reproducing apparatus as the video image processing apparatus according to a first embodiment of the present invention.

Referring to the drawings, the embodiments of the present invention are now discussed.

FIG. 1 is a block diagram showing the still image reproducing apparatus as the video image processing apparatus according to the first embodiment of the present invention.

In the still image reproducing apparatus, the pseudo frame video data is produced based on the field video data stored in the recording medium. The construction and operation of the still image reproducing apparatus are now discussed.

In the still image reproducing apparatus, the video data stored in a recording medium 1 such as a memory card, magnetic disk or optical disk is read into a frame memory 2. The frame memory 2 has the predetermined number of memory cells for storing the video data of the odd field and even field. CPU 8 contains means for recognizing FID codes that are field attribute information stored along with the video data. CPU 8 decodes the field attribute information and indicates, to a memory control module 3 having write odd/even line position modifying means, the write area in the frame memory 2 where the field video is written. Thus, the odd field data and even field data are written to the predetermined addresses in the frame memory 2.

While the vide data read from the frame memory 2 is interpolated by the interpolation processor module 4 serving as the interpolation unit, CPU 8 instructs the interpolation processor module 4 to interpolate the other field based on the video data written to the frame memory 2. The interpolation processor module 4 averages the video data of the pixels on one scan line with the video data of the pixels on the next scan line, and the averaged video data is stored in vacant addresses sequentially in the frame memory 2 as the pixel data to be interlaced at the next field in succession to the recorded field video data.

Figure 2:
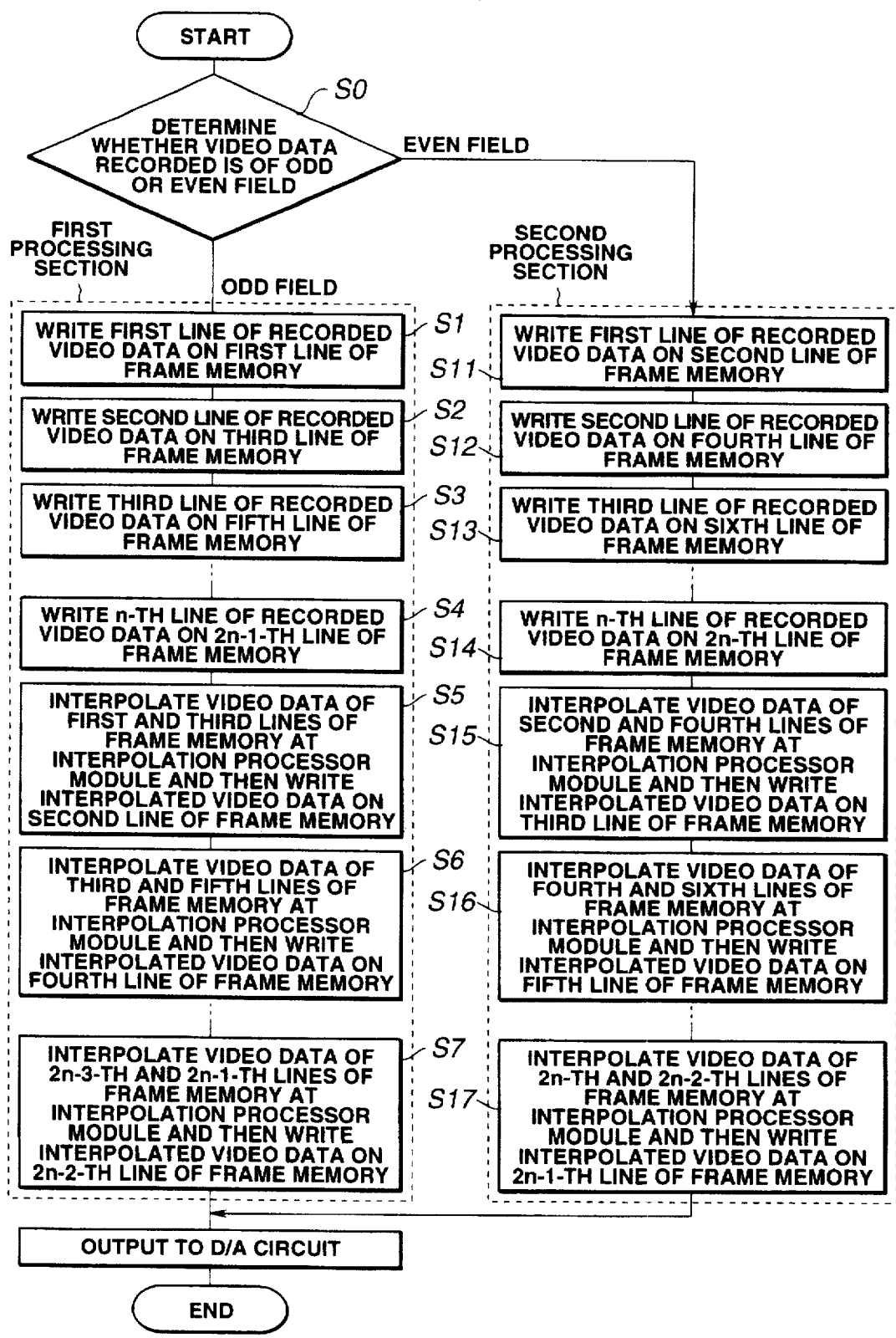
FIG. 2 is a flow diagram showing the interpolation process of the field video data in the still image reproducing apparatus of FIG. 1.

Referring to the flow diagram in FIG. 2, the interpolation process of the field video data in the memory control module 3 is discussed. CPU 8 decodes the FID code stored along with the video data, and feeds an FID flag signal to the memory control module 3. Referring to the FID flag signal, a determination is made of whether the recorded data is of odd field or even field (step S0).

Figure 17:
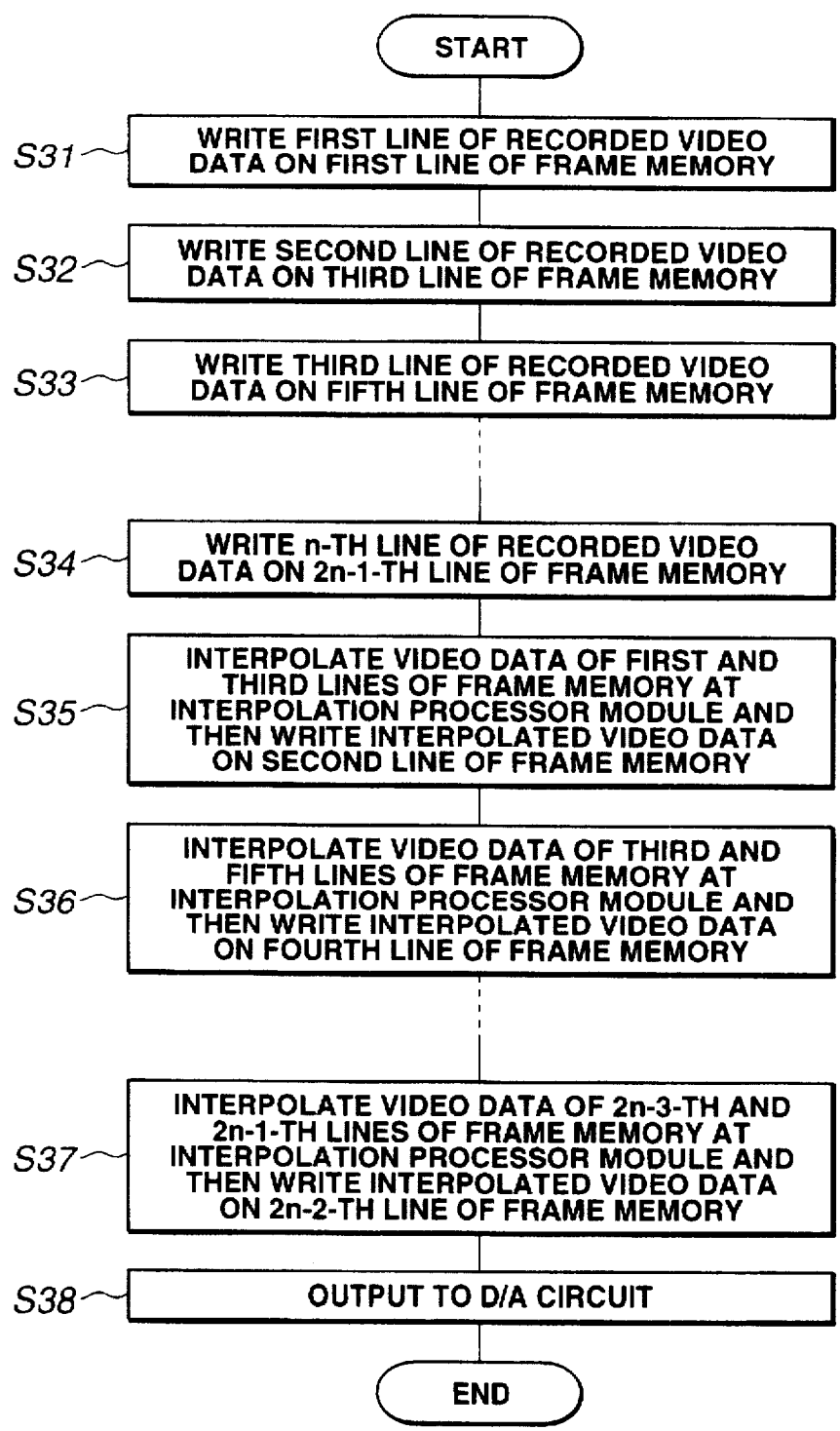
FIG. 17 is a flow diagram showing the interpolation process in the known still image reproducing apparatus of FIG. 16.
Figure 18:
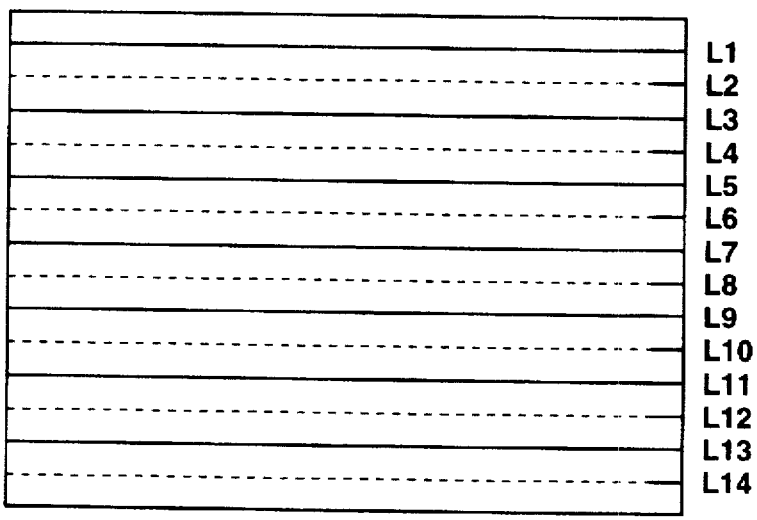
FIG. 18 shows the scan lines presented on a monitor as the frame video signal in the odd field and even field in the known still image reproducing apparatus of FIG. 16.

If the recorded video data is of an odd field, steps S1 through S7 in the first processing section are executed. This process remains unchanged from the process in the prior art memory control module shown in FIG. 17.

If the recorded video data is of even field, steps S11 through S17 in the second processing section are executed.

The data of the first line (L1) of the recorded video data is written to the second line (L2) of the frame memory 2 (step S11), and then the data of the second line of the recorded video data is written to the fourth line of the frame memory 2 (step S12).

The above steps are repeated until the n-th line (n is a predetermined integer equal to or greater than 1), namely, the last line of the recorded video data is written onto the 2n-th line of the frame memory 2 (step S14). This completes the write operation of the recorded video data onto the frame memory 2.

To interpolate between lines of the frame memory 2 onto which the video data is recorded, video data on the second and fourth lines of the frame memory 2 is outputted to the interpolation processor module 4, and the computed result given by the interpolation processor module 4 is written on the third line of the frame memory 2 (step S15).

The above step is repeated until video data of the (2n−2)-th line and 2n-th line of the frame memory 52 is outputted to the interpolation processor module 4 and the computed result given by the interpolation processor module 4 is written on the (2n−1)-th line of the frame memory 52 (step S17).

The pseudo frame video data obtained through the process in the first or second processing section is thus written to the frame memory 2.

Figure 3:
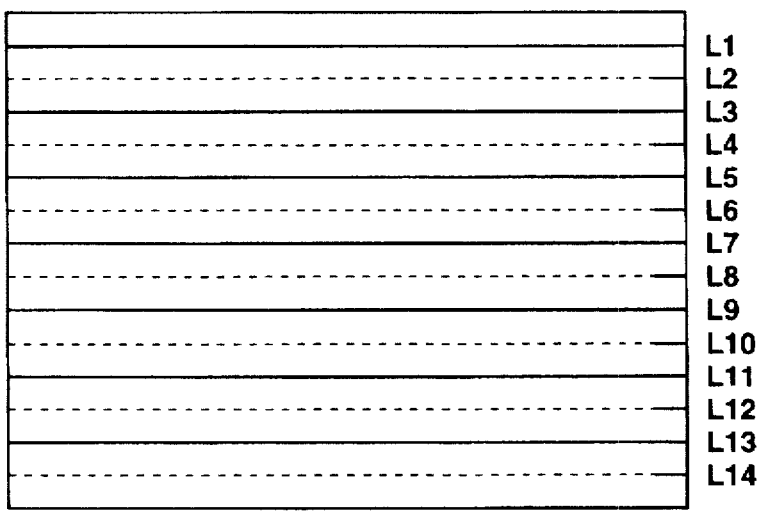
FIG. 3 is a diagram showing the scan lines of the reproduced video image when the video data recorded in the still image reproducing apparatus of FIG. 1 is odd field data.
Figure 4:
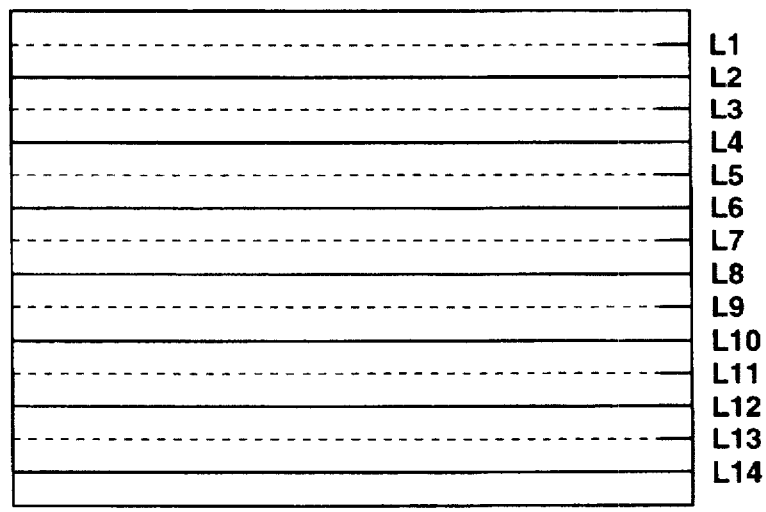
FIG. 4 is a diagram showing the scan lines of the reproduced video image when the video data recorded in the still image reproducing apparatus of FIG. 1 is even field data.

FIGS. 3 and 4 show the positions of the scan lines of the reproduced video for the odd field and even field recorded video data, respectively, obtained through the above described process. When the video data is of odd field, recorded field data, and then interpolated field data are sequentially stored from the top down of the physical addresses of the frame memory 2. On the other hand, when the video data is of even field, interpolated field data, and then recorded field data are sequentially stored from the top down of the physical addresses of the frame memory 2. In the case of the even field, the data written to the first line of the frame memory 2 contains no data to be interpolated with the data of the second line. Thus, either zero level data or half the value of second line L2 data is adopted as the data to be interpolated.

The read timing from the frame memory 2 is controlled by the memory control module 3. The video data read from the frame memory 2 is converted by a D/A converter 5 into an analog signal, which is then converted by an encoder 6 into a video signal. In the encoder 6, the synchronizing signal generated by a synchronizing signal generator 7 is added to the output signal from the D/A converter 5.

As described above, according to the still image reproducing apparatus of this embodiment, CPU 8 is provided to read the FID code of the recorded data. Based on the read information, CPU 8 modifies the memory addresses of the frame memory for writing. Thus, regardless of whether the recorded video data is of odd field type or even field, the apparatus of the present invention reproduces the pseudo frame video free from one line discrepancy that is experienced in the prior art apparatus.

Figure 5:
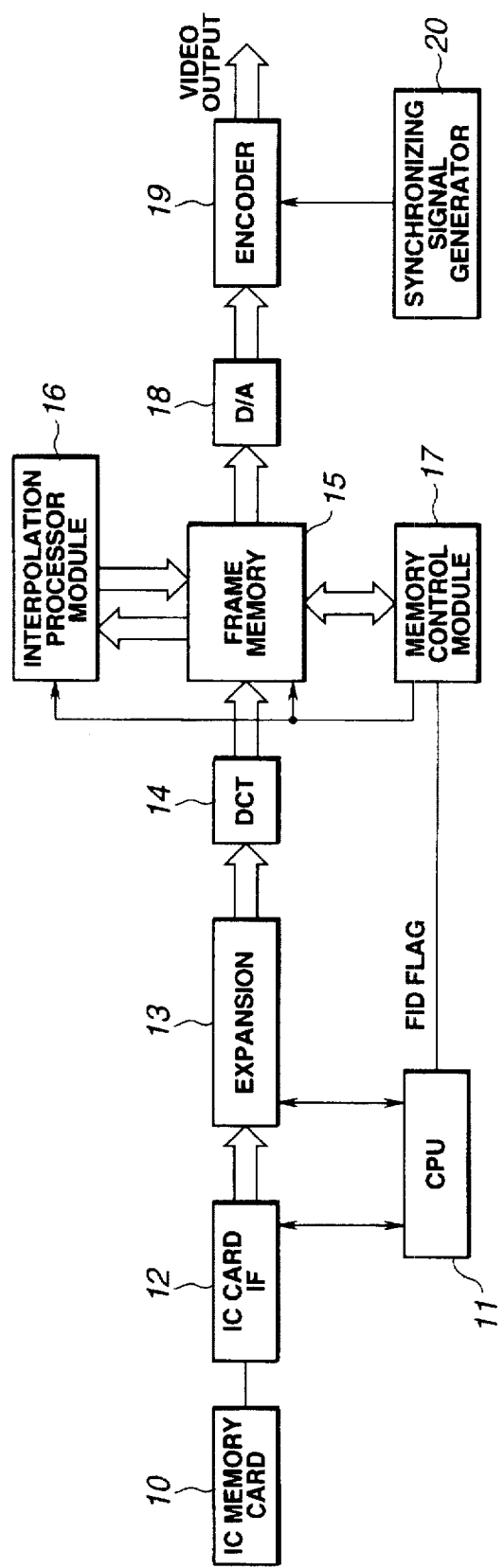
FIG. 5 is a block diagram showing still image reproducing apparatus as the video image processing apparatus according to a second embodiment of the present invention.

FIG. 5 shows the still image reproducing apparatus as the video image processing apparatus according to the second embodiment of the present invention. Discussed herein are the file structure of the field video data recorded into the recording medium and the process of producing the pseudo frame video data based on the field video data.

Figure 6:
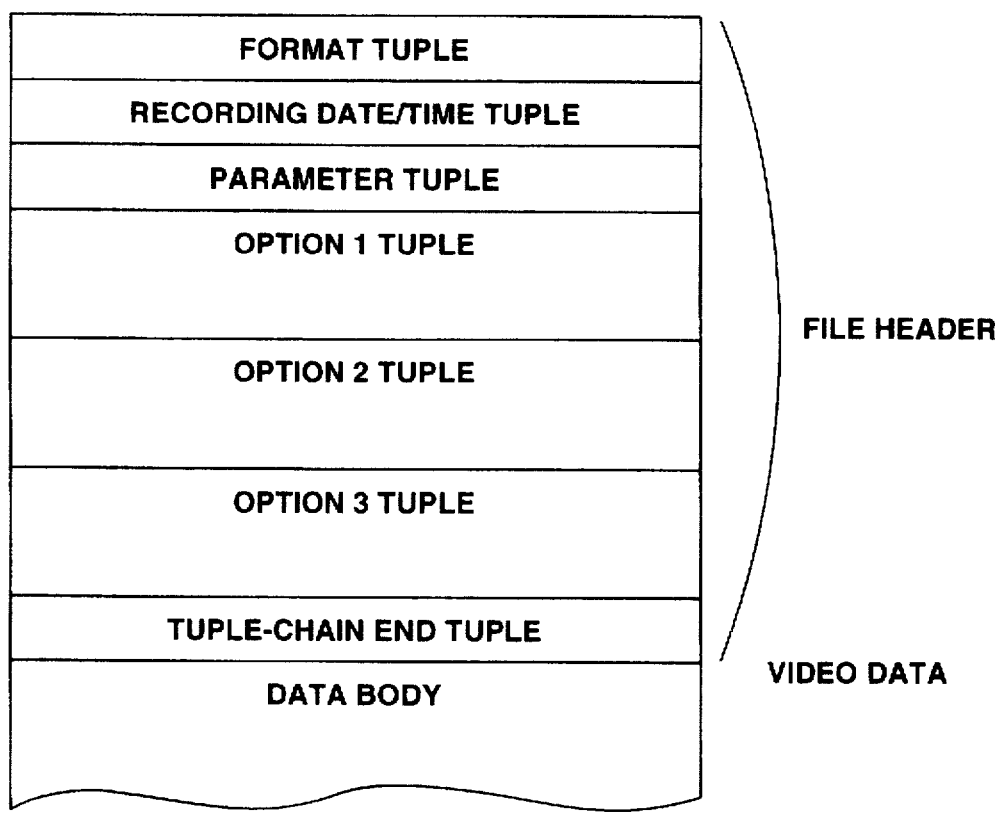
FIG. 6 shows the file structure of the video data in the still image reproducing apparatus of FIG. 5.

An IC memory card 10 as a recording medium stores video data. The video data complies with the Standard of JEIDA (Japan Electronic Industry Development Association), which is a widely used standard. The file structure of each video data includes a file header and video data as shown in FIG. 6.

The file header is made up of a format tuple bearing format information, a recording date/time tuple bearing recording date and time, a video parameter tuple bearing video parameter information, and other tuples.

Figure 7:
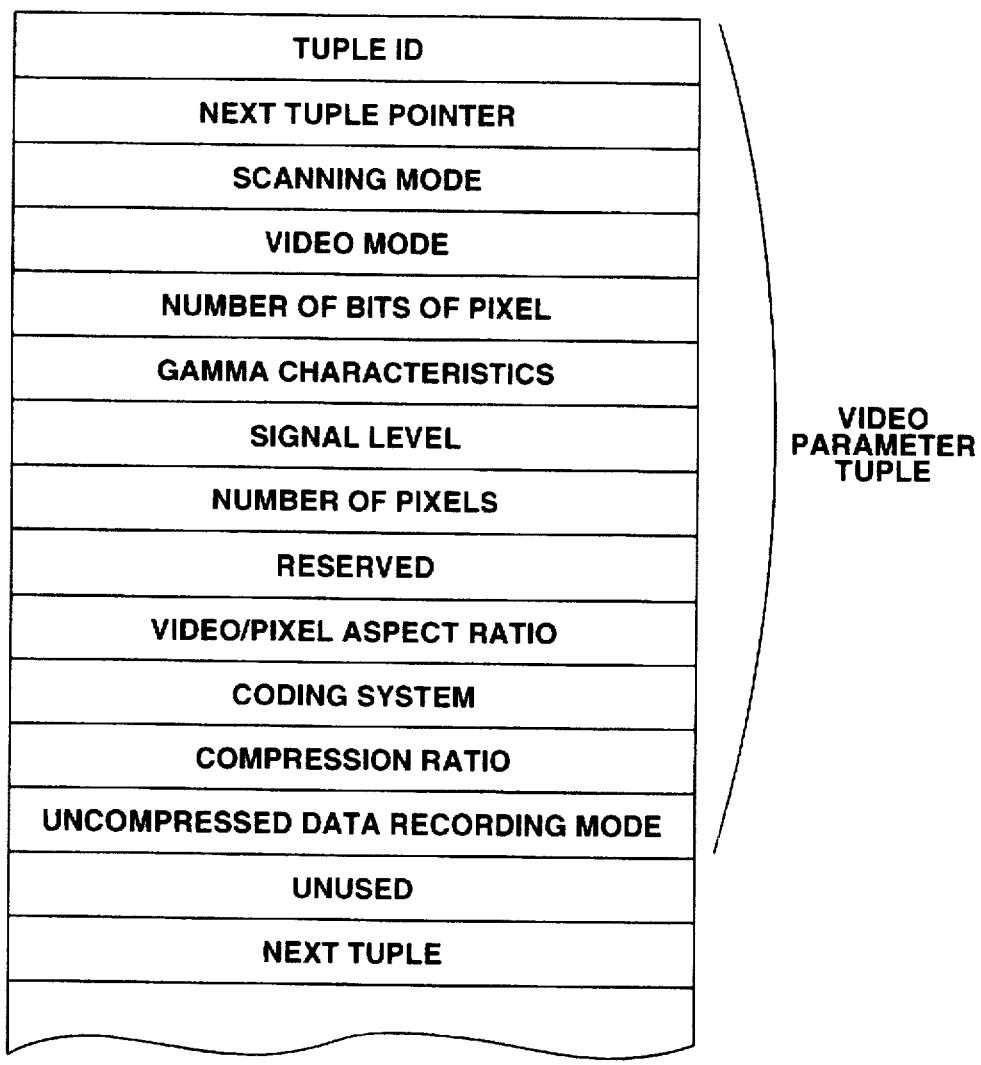
FIG. 7 shows the structure of the video parameter tuple of the file header of the video data in the still image reproducing apparatus of FIG. 5.

As shown in FIG. 7, the video parameter tuple includes a tuple ID, a next tuple pointer, a scanning mode, video mode, gamma characteristics, the number of pixels, and other setting items. The setting of the scanning mode is arranged in code as shown in the field attribute information in FIG. 8.

The IC card interface 12 for the IC memory card 10 connects to control access to the IC memory card 10.

Since the video data stored in the IC memory card 10 is compressed in the compression mode according to the Standard of JPEG (Joint Picture Expert Group), it needs to be Huffman decoded by an expander 13. The decoded video data is transferred to a DCT module 14. The DCT module 14 inverse discrete cosine transforms the decoded video data into 8×8 block video data, which is then transferred to a frame memory 15. The IC card interface 12, expander 13 and DCT module 14 are controlled by CPU 11 that contains a built-in reproducing unit.

CPU 11 also decodes the field attribute information recorded in the parameter tuple of the filer header in the recorded video data.

When the video data is transferred to the frame memory 15, a memory control module 17 reads an FID flag signal which CPU 11 outputs by identifying a field attribute indicative of the odd field or even field, and CPU 11 specifies the memory addresses to which the video data transferred from the DCT module 14 is written, referring to whether the video data is odd field video data or even field video data.

Figures 8, 9:
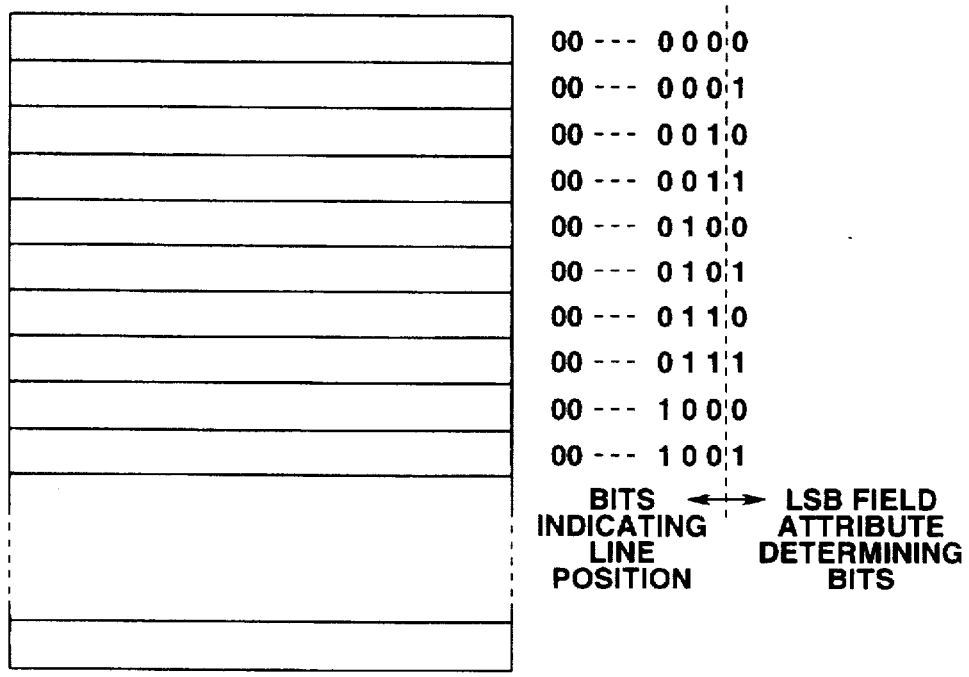
FIG. 8 shows the field attribute of the video parameter tuple of the video data in the still image reproducing apparatus of FIG. 5.
FIG. 9 shows the memory addresses that store data on the scan lines of the video data in the still image reproducing apparatus of FIG. 5.

In the apparatus of this embodiment, the addresses that store the video data of the scan lines start with 00 . . . 0000 for the top most line, and then 00 . . . 0001, 00 . . . 0010, 00 . . . 0011, . . . in that order as shown in FIG. 9. An LSB (least significant bit) is the bit indicative of the field attribute. The value 0 indicates the memory that stores the video data of one line of the odd field. The value 1 indicates the memory that stores the video data of one line of the even field. The bits other than the LSB indicate the line position from the top of each field. According to the above rule of addressing, the video data transferred from the DCT module 14 is stored in the corresponding addresses in the frame memory.

Figure 10:
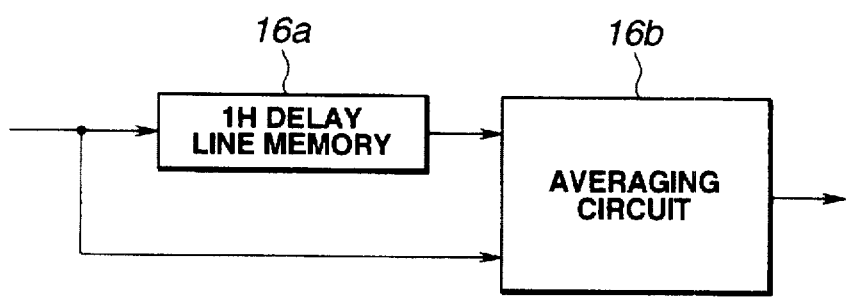
FIG. 10 is a block diagram of the interpolation processor module of the still image reproducing apparatus of FIG. 5.

The field video data stored in the frame memory is interpolated by the interpolation processor module 16 and then becomes the pseudo frame data. FIG. 10 shows the configuration of the interpolation processor module 16.

The video data stored in the frame memory 15 is sequentially retrieved from the memory addresses corresponding to the scan lines and then input to a 1H delay line memory 16a. The output of the 1H delay line memory 16a and the video data prior to the 1H delay line memory 16a are averaged by an averaging circuit 16b, and the averaged result is stored in predetermined addresses sequentially as pixel data to be interlaced at the next field in succession to the recorded field video data. Thus, the pseudo frame video data results.

The above pseudo frame process is identical to that in the still image reproducing apparatus of the first embodiment.

The pseudo frame video signal is transferred to a D/A converter 18. The D/A converter 18 converts the pseudo frame video signal into an analog signal, which is then converted by an encoder 19 into a video signal. In the encoder 19, the synchronizing signal generated by a synchronizing signal generator 20 is added to the output signal of the D/A converter 18.

As described above, according to the still image reproducing apparatus of this embodiment, CPU 11 decodes the file header of the video file stored in the IC memory card 10, and the field odd/even information of the reproduced video data is output to the memory control module 17. When the recorded video data is written to the frame memory, it is written to the predetermined memory area according to the field odd/even information. Therefore, one line discrepancy is not caused by the difference between the odd field and even field that takes place in the course of pseudo frame processing of the field video data in the prior art.

This embodiment is not limited to the processing of the video data read from the IC memory card. For example, this embodiment works in the processing of the video data that is directly taken from a field-driven image pickup section, which outputs the field video signal of 60 fields per second. In a system that records the video signal output from the image pickup section at a rate of 4 fields per second, the video data is recorded necessarily in the order of odd field to even field. If the apparatus of this embodiment is used to reproduce the video data, the video data of two consecutive fields suffers no one-line discrepancy problem.

The video data reproduced in this embodiment is not necessarily output to an interlaced monitor. The same advantage is achieved on non-interlace monitors such as those for personal computers by causing the memory control module 17, which controls the output of the pseudo frame data stored in the frame memory, to perform controlling in a non-interlace fashion.

This embodiment offers the memory control method of reproducing the field video data recorded. In the recording apparatus of the electronic still camera, the same memory control method is applied when the field video data output from the image pickup section is recorded as a pseudo frame video.

As described above, in the electronic still cameras according to the first and second embodiments, pseudo frame processing is performed in consideration of the field attribute when the video data taken under the same angle of view is reproduced. Thus, the reproduced data free from one-line discrepancy difference is observed on the monitor.

An electronic still camera as the video image processing apparatus according to the third embodiment of the present invention is now discussed. The camera of this embodiment reduces the amount of information attached to the data file as much as possible. The camera of this embodiment is also advantageously constructed so that the pseudo frame video data is free from one line discrepancy when the field video data taken in sequence photographing is recorded in the video image processing apparatus of the first and second embodiments.

Figure 11:
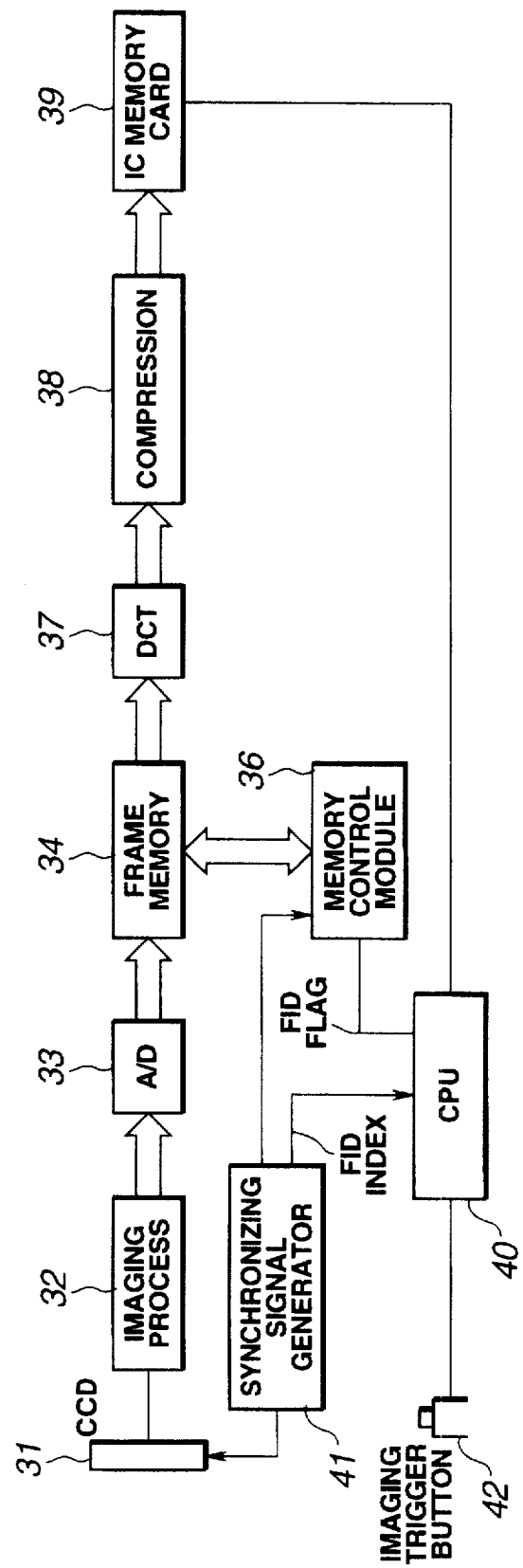
FIG. 11 is a block diagram showing an electronic still camera as the video image processing apparatus according to a third embodiment of the present invention.

FIG. 11 shows the construction of the camera of this embodiment. The video signal, into which CCD 31 serving as a field-driven solid-state image pickup device photoelectrically converts an image, is subjected to signal processing, such as gamma correction, in an image processor module 32.

The video signal is converted into digital data by an A/D converter 33 and then written to a frame memory 34. The video data stored in the frame memory is recorded to a recording medium through a recording unit. Specifically, to compress the video data according to the JPEG Standard, the video data is discrete cosine transformed through DCT 37, and then coded by a compressor 38. The compressed video data is recorded to an IC memory card 39 as the recording medium. In the camera of this embodiment, a synchronizing signal generator 41 and a memory control module 36 operate in synchronism.

The video file recorded to the IC memory card 39 is made up of a file header and video data in a normal photograph recording mode.

When sequence photographing is performed, a movie output from the CCD is typically used to be recorded as the field video data. In such a case, the CCD gives 60 fields of the field video data per second.

Figure 12:
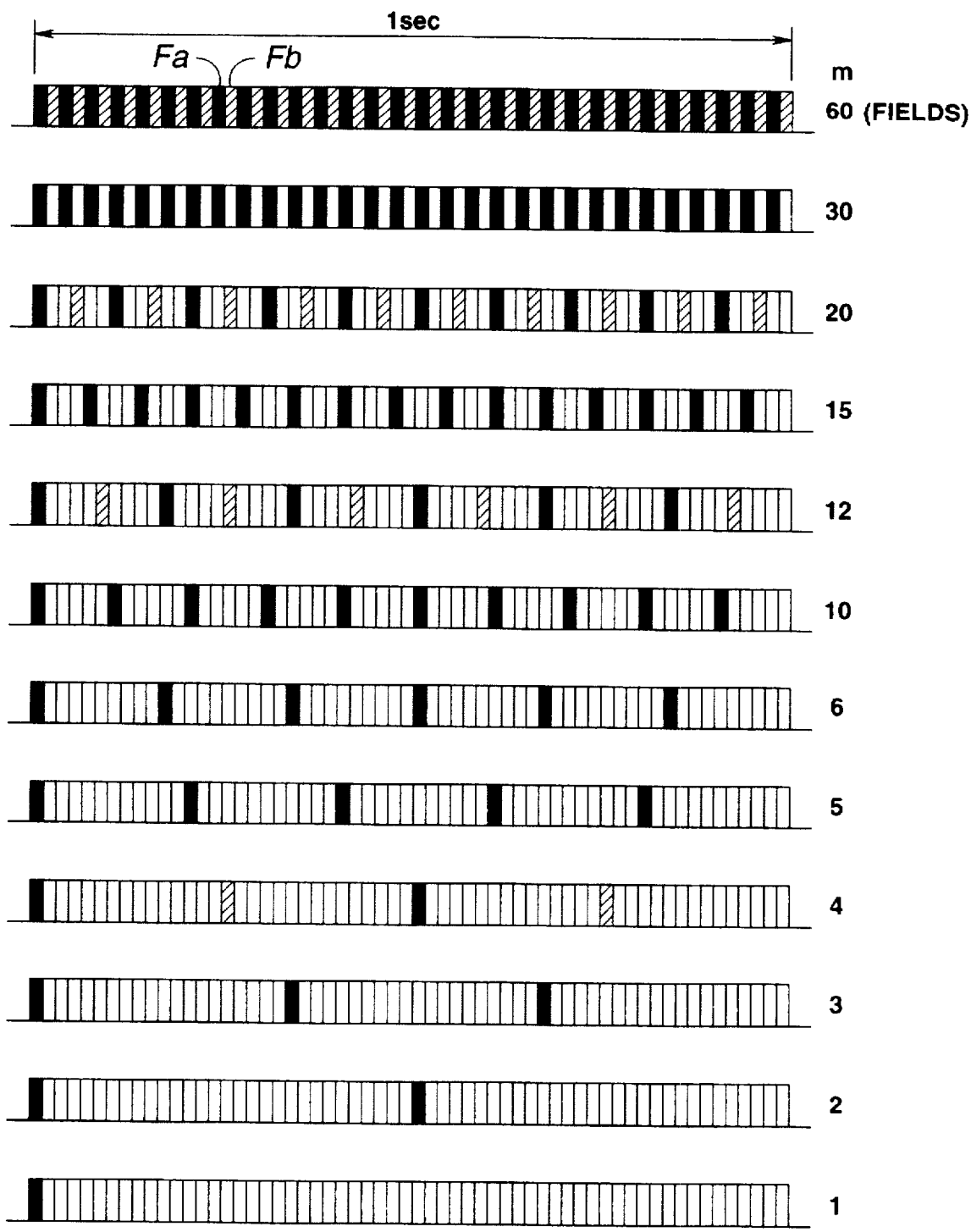
FIG. 12 shows the recording order of the photograph video data of the odd field and even field according to the number of photograph fields per unit time when sequence photographing is performed in the electronic still camera of FIG. 11.
Figure 15:
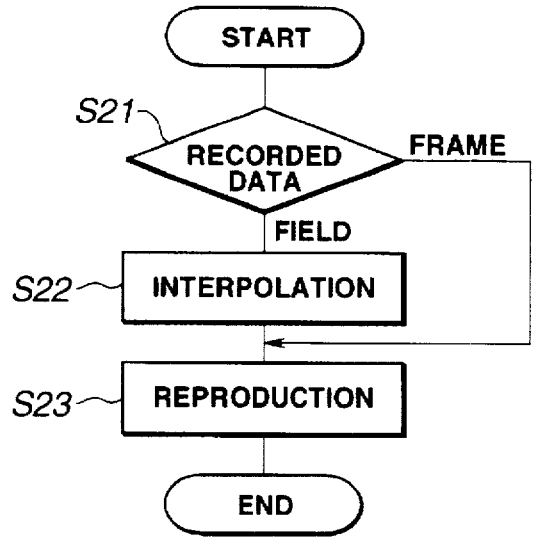
FIG. 15 is a flow diagram showing the process of reproduction performed after interpolation in the still image reproducing apparatus as one of the typically known video image processing apparatuses.
Figure 16:
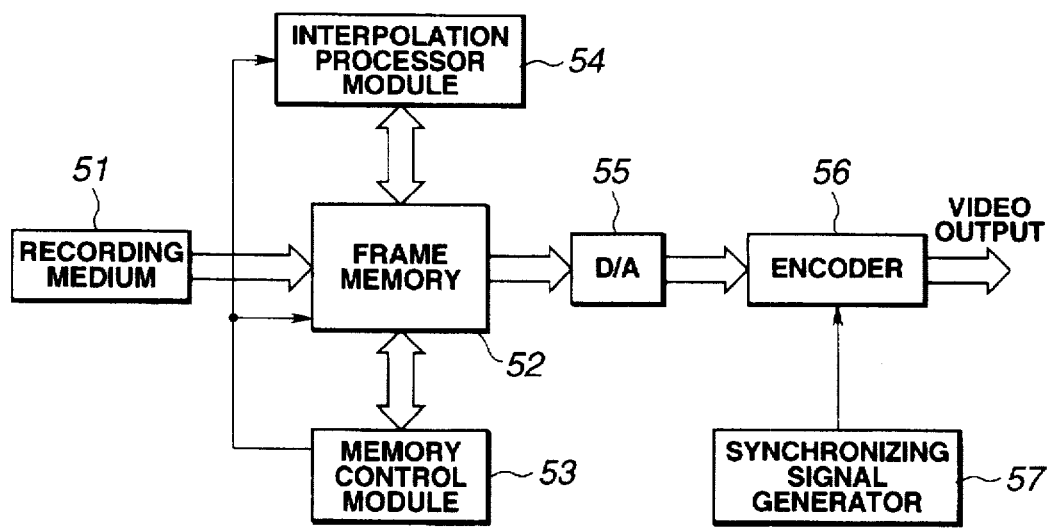
FIG. 16 is a block diagram of the still image reproducing apparatus as one of the typically known video image processing apparatus.

To keep constant the intervals between photographs, the number of fields m per second is given by m=60/n (fields/second), where n and m are an integer equal to or greater than 1. The intervals in sequence photographing are n/60 (second) (FIG. 12). In sequence photographing, the number of fields per second, 60/n, is acceptable to keep the intervals equal in practice.

FIG. 12 shows the relationship of the number of fields/second with odd field and even field video data. The field attribute about the number of fields is, for example, 60 fields per second (n=1) on the top sequence in FIG. 12, and the odd fields Fa and even fields Fb are alternatingly sequentially output. In a movie photograph mode for recording this output, the duration of photograph recording is a period of time during which a photograph triggering button 42 as a photograph triggering member is continuously pressed. The first field data to be recorded is a field immediately subsequent to the moment the photograph triggering button 42 is pressed. Two types of the sequential order of field attributes to be recorded are possible: first type sequence: odd, even, odd, even, . . . ; or second type sequence: even, odd, even, odd, . . . . FIG. 12 shows the first type sequences.

In the same manner as in 60 fields/second, the odd fields and even fields alternate in 20 fields/second (n=3), 12 fields/second (n=5), and 4 fields/second (n=15), and depending on the first field, two types of recording are combined.

In the rest of the frame sequences, other than the above frame sequences, 30 fields/second (n=2), 15 fields/second (n=4), 10 fields/second (n=6), 6 fields/second (n=10), 5 fields/second (n=12), 3 fields/second (n=20), 2 fields/second (n=30), and 1 field/second (n=60), the video data is either odd fields only or even fields only. Whether the video data is odd field or even field is determined depending on the timing the photograph triggering button 42 is pressed. Two types of recording are thus combined.

In connection with the field video data of a plurality of fields sequentially photographed, the recording information of the video data as described above is recorded in the video parameter tuple of a single common file header. This control process is executed by CPU 40 as control unit.

Specifically, as the information recorded in the video parameter tuple, items for field attribute setting and the number of fields in sequence photographing are newly added to the video parameter tuple in compliance with JEIDA Standard (FIG. 7) as shown in FIG. 13. The field attribute setting item is arranged in two bits, indicating the field generation pattern, as shown in FIG. 14. Bit A indicates the attribute information of the field data recorded first, and bit B indicates whether the field attribute alternates between odd and even or remains unchanged. Thus, four types of sequences of the field attribute are identified.

When the video data thus sequentially photographed is sequentially reproduced in the still image reproducing apparatuses of the embodiments 1 and 2, the CPU as the control means decodes the file header of the series of video data, knows the number of fields in sequence photographing and determines from the field generation pattern information which attribute sequence out of the four types the video data takes. The CPU thus outputs the FID flag to the memory control module in response to the reproduced video data, and the field attribute information is easily retrieved and the pseudo frame video data is easily produced without one line discrepancy.

The camera of this embodiment needs no individual file header for each video data, and thus needs less memory capacity compared to the prior art sequence video data. Furthermore, when the video data is reproduced the, CPU is freed from decoding the video parameter tuple bearing the field attribute from the video file header. A fast processing speed thus results.

In sequence or movie photographing, the present invention offers substantial advantages in terms of video data amount and recording speed. In particular, sequence photographing handles a large number of fields of video data, namely m fields/second (m is an integer equal to or greater than 1), and the file header is attached to each field of video data in the prior art video image processing apparatus. This results in a large amount of video data files. When the video data file is written to the recording medium, the file header should be written separately from the video data. This presents a limitation achieving a fast recording and processing speed. According to the camera of this embodiment, however, the field attribute information common to a series of photograph video images in sequence photographing is attached to the header video field only. The field attribute information is utilized during reproduction. A fast processing speed is achieved and the amount of information attached to the sequenced video data files is reduced.

What is claimed is:

1. A video image processing apparatus comprising:
   a reproducing unit for reproducing field video data from a recording medium that stores the field video data and field attribute information about the field video data,
   a video memory for temporarily storing the field video data reproduced by the reproducing unit,
   an interpolation unit for interpolating the field video data stored in the video memory and then outputting interpolated video data, and
   a memory control unit for controlling writing to and reading from the video memory, whereby the memory control unit comprises an element for modifying a write line position of the field video data to the video memory, to the odd line position or even line position, depending on whether the field attribute information about the reproduced field video data to be interpolated is odd or even to prevent a one-line discrepancy between odd and even fields stored in the video memory.

2. A video image processing apparatus comprising:

a reproducing unit for reproducing field video data from a recording medium that stores field video data and field attribute information about the field video data, a frame memory for temporarily storing the field video data reproduced by the reproducing unit, an interpolation unit for interpolating the field video data stored in the frame memory and then outputting the interpolated video data, and a memory control unit for controlling writing and reading from the frame memory, whereby the memory control unit comprises an element:
  (i) for writing the field video data to an odd line position in the frame memory when the reproduced field video data to be interpolated corresponds to an odd field, while writing interpolated video data that is given by the interpolation unit based on the field video data, to the even line position in the frame memory, and
  (ii) for writing the field video data to an even line position in the frame memory when the reproduced field video data to be interpolated corresponds to an even field while writing interpolated video data that is given by the interpolation unit based on the field video data, to the odd line position in the frame memory, whereby a first line of the interpolated field video data is provided for at a first line position of the frame memory to prevent a one-line discrepancy between an odd field and an even field.

3. A video image processing apparatus comprising:

a solid-state image pickup device for reading and outputting charge responsive to an optical image on a field-by-field basis, a recording unit for processing the field video signal output from the solid-state image pickup device, into a form suitable for recording, and for recording a resulting field video signal to an intended recording medium, a photograph triggering member for triggering a photographing operation, and a control unit for controlling the recording unit so that the recording unit sequentially video records to the recording medium at a predetermined speed as long as the photograph triggering member remains activated, whereby, for the recording unit to sequentially record field videos to the recording medium, the control unit comprises an element that performs controlling to record, as pieces of information common to sequentially recorded videos, field attribute information comprising a number of a series of sequentially recorded video frames and a field generation pattern based on one selected from sequence photograph recording speeds defined by 60/n=m fields/second (where n and m are integers equal to or greater than 1).

4. The apparatus of claim 2, wherein said element further comprises:

means responsive to field attribute data identifying an even field for controlling the interpolation unit to divide pixels of a first scan line of an even field by two (2) and outputting a result of the division to a location in the frame memory for storing a first scan line of the even field.

5. The apparatus of claim 2 wherein said element further comprises:

means responsive to field attribute data identifying an even field for inserting a scan line of pixels of zero value in a location in the frame memory for storing a first scan line of the even field.

6. A video image processing apparatus according to claim 3 further comprising:

means for determining that a sequence of recorded videos begins with either an odd or an even field responsive to a timing of operation of the photograph triggering member relative to an output of a synchronizing signal generator which regulates a number of frames produced during a given time interval.

7. A video image processing apparatus according to claim 3 further comprising:

means responsive to an output of a synchronizing signal generator for determining if a frame sequence is comprised of odd and even fields, only odd fields or only even fields.

8. A video image processing apparatus according to claim 3 further comprising:

means for recording information of the video data in a video parameter tuple of a single common file header.

9. A video image processing apparatus according to claim 3 further comprising:

means for generating a sequence of video data to eliminate a need for providing field attribute data in a file header of each field.

10. A video image processing apparatus according to claim 3 further comprising:

means for generating a video parameter tuple which includes a two bit binary code for identifying whether a first field to be stored is odd or even and whether the fields to be stored are both odd and even.

* * * * *

UNITED STATES PATENT AND TRADEMARK OFFICE
CERTIFICATE OF CORRECTION

PATENT NO.  : 5,751,886
DATED       : May 12, 1998
INVENTOR(S) : Komine

It is certified that error appears in the above-identified patent and that said Letters Patent is hereby corrected as shown below:

Col. 1, line 22, delete "522" and insert --S22--.

Col. 4, line 4, delete "field by field" and insert --field-by-field--.

Col. 5, line 57, delete "vide" and insert "video".

Col. 7, line 2, after "field (second occurrence) insert --type--.

Signed and Sealed this

Twenty-second Day of June, 1999

Attest:

Q. TODD DICKINSON

Attesting Officer

Acting Commissioner of Patents and Trademarks